United States Patent [19]

Komura et al.

[11] Patent Number: 4,907,095
[45] Date of Patent: Mar. 6, 1990

[54] STILL IMAGE TRIMMING APPARATUS

[75] Inventors: Tsuneo Komura; Tsutomu Abe; Naoto Usa, all of Tokyo, Japan

[73] Assignee: Fuji Photo Film Co., Ltd., Kanagawa, Japan

[21] Appl. No.: 182,100

[22] Filed: Apr. 15, 1988

[30] Foreign Application Priority Data

Apr. 16, 1987 [JP] Japan .................................. 62-94026
Apr. 16, 1987 [JP] Japan .................................. 62-94027

[51] Int. Cl.⁴ ........................................... H04N 1/393
[52] U.S. Cl. .................................... 358/451; 358/453; 358/479
[58] Field of Search ............... 358/256, 280, 293, 909, 358/451, 453, 479

[56] References Cited

U.S. PATENT DOCUMENTS 4,614,977  9/1986  Kawahara et al. ................. 358/280
4,769,694  9/1988  Oshikoshi ............................ 358/909

Primary Examiner—Edward L. Coles, Sr.
Attorney, Agent, or Firm—Birch, Stewart, Kolasch & Birch

[57] ABSTRACT

A still image trimming apparatus is disclosed which is capable of automatically creating a video signal representing a still image within an area set by a trimming frame while displaying, on a monitor device, a combined image comprising a still image in a photographic or similar print and the trimming frame for setting the trimming area superimposed on the still image. Also, in the still image trimming apparatus, in trimming and recording onto a recording medium, the divisional images of a still image corresponding to the structure of a multi-screen comprising a plurality of display screen arranged from a plane manner, without cutting a still image recorded from a photographic or a similar print into equal parts, the still image can be trimmed to correspond with the structure of the multi-screen device while monitoring a multi-image on the screen of the monitor device.

16 Claims, 7 Drawing Sheets

STILL IMAGE TRIMMING APPARATUS

BACKGROUND OF THE INVENTION

1. Field of the Invention

The present invention relates to a still image trimming apparatus for trimming a still image in photographic or similar printing and, in particular, to a still image trimming apparatus which is capable of trimming the still image while monitoring a composite image comprising the still image and a trimming frame superimposed on the still image for setting a trimming range.

2. Description of the Related Art

Recently, with the arrival of a new media age, various kinds of AV (audio-visual) products have been developed and put into practical uses. Among these AV products, is a video signal reproducer for use in a magnetic recording/reproducing apparatus to reproduce a still image, recorded on a rotary magnetic recording medium, on the display screen of a television, or similar display device which has attracted public attention because it is able to conveniently to display the image.

An image display apparatus comprising a combination of a television and the above-mentioned type of video signal reproducer is characterized in that it can greatly stimulate the sense of vision of a TV viewer. For this reason, the image display apparatuses having the above characteristics are set up in large numbers in the streets, exhibition halls, and other public places in order to transmit various kinds of guide information, to perform a function as a medium of advertisement publicity or other similar functions.

Conventionally, in order to record onto the video signal reproducer of the above-mentioned type, a still image of photographic or similar printing which is one of a still picture, the image of the photographic print is first picked up and then a video signal corresponding to the still image obtained by such image pickup operation is recorded onto a recording medium.

As an example of an apparatus for creating such a video signal as which corresponds to a still image, a film video player can be illustrated which is disclosed in U.S. Pat. No. 427,077 which corresponds to PCT-international publication No. WO 84/01485 (Japanese translated version No. 59-501768). In this film video player, a still image on a film disc is focused on the light receiving surface of a solid state color image sensor, on an X-Y translation stage, by means of an optical system of a variable image pickup magnifying power. An electric signal corresponding to the still image is then output from the solid state color image sensor. In the film disc video player, a video signal based on the thus output electric signal is created by a signal processing electronic circuit. The thus created video signal is further supplied to a television and the still image based on the video signal is then displayed on the screen of the television.

On the other hand, there has also been proposed, by the subject applicant or others, a multi-screen display apparatus aiming at supplying image information to a large number of people at a time in a place where a large number of people gather together. In this multi-screen display apparatus, the display screens of a plurality of display devices are arranged in a plane to thereby form a multi-screen as a whole, and the divisional images of a single still image can be each of the display screens simultaneously. Thus a single still image can be displayed on the multi-screen formed by the above-mentioned plurality of display screens. In each of the plurality of display devices forming the multi-screen display apparatus, there are video signal reproducers provided for displaying the respective divisional images, one video signal reproducer for each display device.

In the above-mentioned film video player, when partially trimming the still image in the film disc or similar storage medium to create a video signal, the whole still image to be displayed on the display devices must always be monitored for the trimming. Also, when the trimming is performed once, it is impossible to display the entire still image. For this reason, the optical axis of an optical system must be made to coincide, by an eye measurement, with the center of part of the still image in the film disc. Also, the image pickup magnifying power of the optical system must be adjusted to a predetermined value, which requires skill and time.

Also, when the still image is trimmed to thereby create the video signals respectively corresponding to the divisional images of the still image necessary to display the still image on the multi-screen, there must the possibility must be eliminated, that the main portions (for example, face and the like in a human figure) of the still image may happen to appear in a wooden frame supporting the display devices of the multi-screen display apparatus and in the non-display portions that are the peripheral edges of the respective display screens in which overscanning occurs. This results in the unnatural display of the still image on the multi-screen. That is, while monitoring the still image displayed on a television, an operator must take it into consideration that the main portions of the still image may appear in the wooden frame supporting the respective display devices of other multi-screen display apparatus and in the non-display portions of the respective display devices. Also, the optical axis of the image pickup optical system must be adjusted manually to coincide with the centers of the respective divisional images of the still image in the film disc so as to pick up the respective divisional images. However, these operations are, in fact, difficult to perform accurately.

SUMMARY OF THE INVENTION

The present invention aims at eliminating the drawbacks found in the above-mentioned prior art apparatus. Accordingly it is an object of the invention to provide a still image trimming apparatus which, in trimming a still image on a film disc or similar storage medium and creating a video signal, is capable of trimming the still image while setting the peripheral edges of the portion of the still image to be trimmed on a still image displayed by a television or and also which is capable of automatically creating a video signal corresponding to the still image set by the peripheral edges.

In attaining the above object, according to one aspect of the invention, a still image trimming apparatus is provided which trims a still image in a photographic or similar print while displaying the still image on a cathode-ray tube or similar display device after the still image is picked up, the apparatus comprising: a support table for supporting the photographic or similar print thereon; image pickup means including an optical system of a variable image pickup magnifying power for outputting a video signal obtained by picking up the image of the photographic print placed on the support table; drive means for moving the support table or the image pickup means; pattern generation means for outputting a pattern signal representing a trimming frame for setting the trimming peripheral edge of the photographic or similar print; signal process means for combining the video signal from the image pickup means with the pattern signal from the pattern generation means to output a video signal corresponding to a combined image consisting of a still image and the trimming frame superimposed thereon; image display means for displaying the combined image in accordance with the video signal from the signal process means; and, control means for controlling the drive means such that the optical axis of the optical system of the image pickup means is made to coincide with the center of the still image corresponding to an image area illustrated by the trimming frame and also for enlarging the image pickup magnifying power of the optical system so that the still image corresponding to the image area illustrated by the trimming frame can be displayed on the entire display screen of the image display means.

In operation, according to the invention, the still image in the photographic or similar print placed on the support table is picked up by the image pickup means having an optical system of a variable image pickup mangification. Next, the video signal obtained by the image pickup and the pattern signal output from the pattern generation means corresponding to each of trimming frames are combined together by the signal processing means. As a result of this, there is output a video signal which corresponds to a combined image consisting of the still image and the trimming frame superimposed thereon. The video signal is then supplied to the image display means. Then, the image pickup magnification of the image pickup means optical system is controlled by the control means such that, among the combined image displayed on the image display means, a photographic image in an image area illustrated by the trimming frame can be displayed in an enlarged manner. Also the drive means is controlled by the control means such that the still image can be moved and displayed on a display screen. Thus, according to the invention, the trimming area of the still image can be established by the trimming frame and also a video signal corresponding to the still image in the image area, established by the trimming frame, can be created automatically.

Further, it is another object of the invention to provide a still image trimming apparatus which, in trimming and recording the divisional images of a still image respectively corresponding to the screen structures of a multi-screen, comprising a plurality of display devices arranged in a plane manner, is capable of trimming the still image in conformity with the screen structures of the multi-screens without cutting the still image into equal parts, while monitoring a multi-image formed by the respective divisional images on the screen of a monitor device.

In order to achieve the above object, according to another aspect of the invention, there is provided a multi-image trimming apparatus which trims a still image in a photographic or similar print to create a multi-image, the apparatus comprising: image pickup means for picking up the still image to output a video signal corresponding to the still image; pattern generation means for outputting pattern signals respectively corresponding to trimming frames for setting the peripheral edges of the respective divisional images of the multi-image; signal processing means for combining the video signal from the image pickup means with the pattern signal from the pattern generation means to output a video signal corresponding to a combined image consisting of the still image and the trimming frame superimposed thereon; and, display means for displaying the combined image in accordance with the video signal from the signal processing means.

In operation, according to the invention, the video signal obtained by picking up the still image in the photographic or similar print by the image pickup means is combined with the pattern signal from the pattern generation means corresponding to the trimming frame for setting the peripheral edges of the respective divisional images forming the multi-image, and the combined signal is then supplied to the image display means. In response to this, the combined image consisting of the still image and the trimming frame superimposed thereon is displayed on the image display means, with the trimming frame corresponding to the peripheral edges of the display screen of a television. In this manner, the peripheral edges of the respective divisional images forming the multi-image, together with the still image, can be displayed on the image display means for monitoring.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a still image trimming apparatus according to the present invention with reference to the accompanying drawings.

Figure 1:
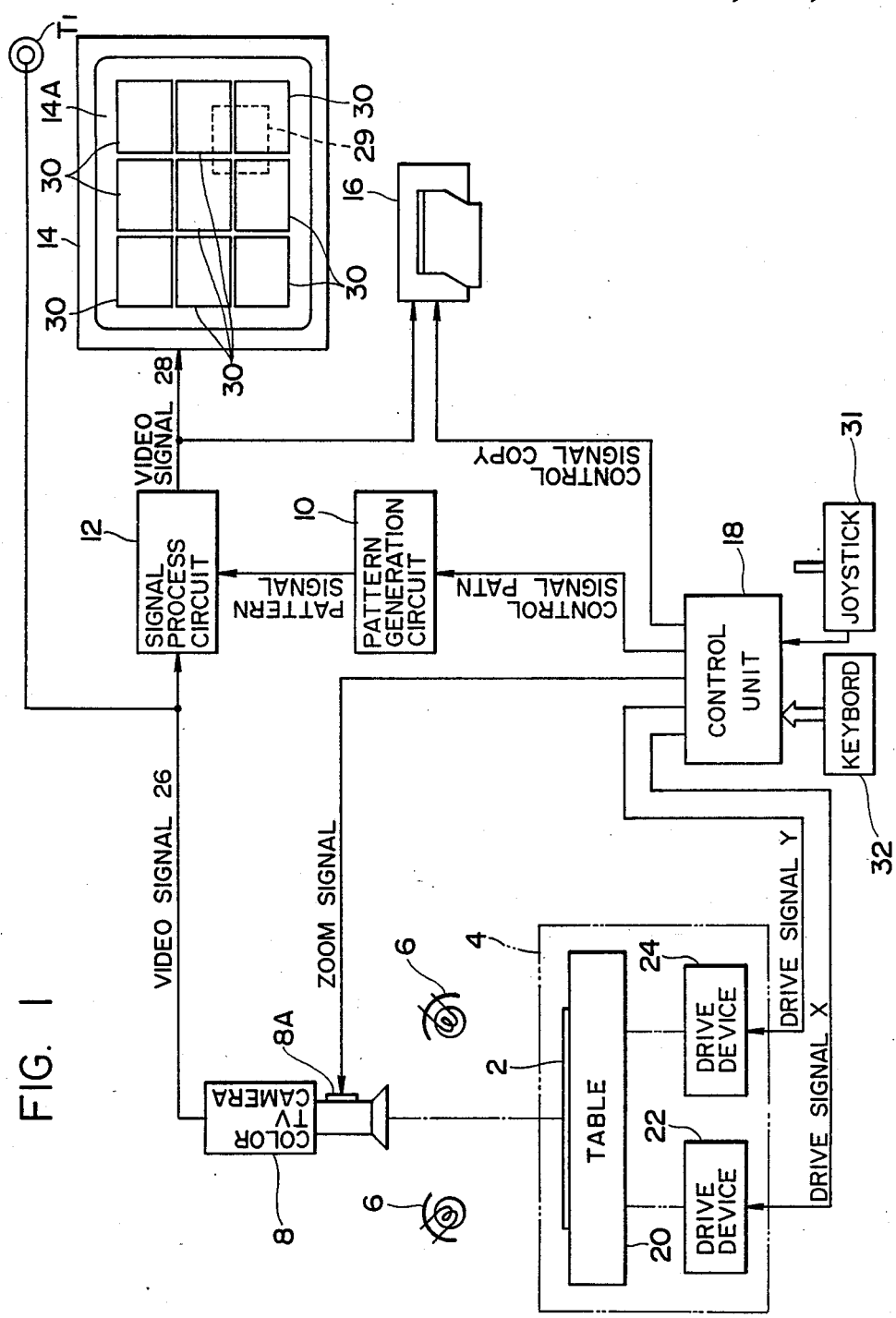
FIG. 1 is a block diagram of the entire structure of a still image trimming apparatus according to a preferred embodiment of invention.

In FIG. 1, there is shown a block diagram of the entire structure of a still image trimming apparatus according to the present invention. In FIG. 1, the present still image trimming apparatus comprises an X-Y table 4 on which a photographic print 2 is placed and also which can be moved in both X- and Y-axis directions; two lamps 6; 6 for illuminating the photographic print 2, a color TV camera 8 for picking up an image in the photographic print 2; a pattern generation circuit 10 for generating square trimming frames 30; a signal process circuit 12 for combining an output signal from the color TV camera 8 with an output signal from the pattern generation circuit 10; a monitor television monitor 14 for displaying an image in accordance with an output signal from the signal process circuit 12; a video printer 16 for hard copying the same image with that displayed on the tube surface 14A of the television monitor 14; and a control unit 18 for controlling the whole still image trimming apparatus.

The X-Y table 4 is composed of a first drive device 22 for moving a table 20 in the X-axis direction and a second drive device 24 for moving the table 20 in the Y-axis direction. The respective drive devices 22, 24 are composed of a drive mechanism such as a stepping motor or a similar drive device, and they can be operated in accordance with drive signals X, Y output from the control unit 18, respectively.

The lamps 6, 6 are constructed such that an illumination having an intensity set greater than the smallest illumination intensity of the color TV camera 8 can be applied evenly to the photographic print 2 that is placed on the table 20.

The color TV camera 8 is normally located just above the substantially central portion of the X-Y table 4 and spaced a predetermined distance apart therefrom, and is supported by a support member which is not shown. The color TV camera 8 is mainly composed of an optical system 8A consisting of a zoom lens having an image pickup magnification which can be varied successively, and a video signal process circuit for creating a video signal 26 representing an object that is focused by the optical system 8A. The video signal 26 output from the color TV camera 8 is supplied to the signal processing circuit 12, and is also supplied through a video signal output terminal T1 to an image recording or similar device which is provided separately and recorded therein. The image pickup magnification can be varied in accordance with a zoom signal output from the control unit 18, with the position of the surface of the image remaining unchanged.

The pattern generation circuit 10 outputs to the signal process circuit 12, in accordance with a control signal PATN output from the control unit 18, a pattern signal for displaying a trimming frame 29 as shown by a broken line on the tube surface 14A of the television monitor 14, or a plurality of trimming frames 30 as shown by solid lines. Images within the respective areas that are shown by the respective trimming frames 29, 30 correspond to the respective screens of an ordinary television. Among these trimming frames 29 and 30, the trimming frame 29 is displayed in such a manner that it is superimposed on the image and also, by moving the trimming frame 29 in the X-Y direction on the tube surface 14A of the television monitor 14, the image to be trimmed can be changed. On the other hand, the trimming frames 30 are displayed correspondingly to the screen structures of a multi-screen, and the intervals among the respective trimming frames 30 are selected to correspond not only to a wooden frame for supporting a television but also to the peripheral edges of a cathode-ray tube that are non-display portions. Thanks to this, the missing portion of the still image to be displayed on the multi-screen can be checked in advance.

The signal processing circuit 12 combines the signal from the color TV camera 8 with the pattern signal output from the pattern generation circuit 10 and corresponding to the trimming frame 29 or trimming frames 30 to create a video signal. Corresponding to a combined signal the combined signal is composed of the still image of the photographic print 2 and the trimming frame 29 or trimming frames 30 superimposed on the photographic print still image. Then, the video signal 28 is supplied to the television monitor 14 and video printer 16, so that the combined image can be displayed on the tube surface 14A of the television monitor 14.

The video printer 16 creates hard copies of the same image with the combined image displayed on the entire tube surface 14A of the television monitor 14 in accordance with a control signal COPY, which is output from the control unit 18.

The control unit 18 performs a trimming control for creating a partial image corresponding to one screen of an ordinary home television and a divisional image corresponding to the unit screen of a multi-screen from the still image in the photographic or similar print. The control unit 18 is composed of a microprocessor, a memory for storing the program of the microprocessor and necessary data, and interfaces for connection with peripheral devices. Also, connected to the control unit 18, there are a joystick 31 and a keyboard 32. An instruction from an operator is given to the control unit 18 by means of the joystick 31 or the keyboard 32.

Next, description will be given below of the operation of the still image trimming apparatus constructed in the above-mentioned manner with reference to FIG. 2.

Figure 2A:
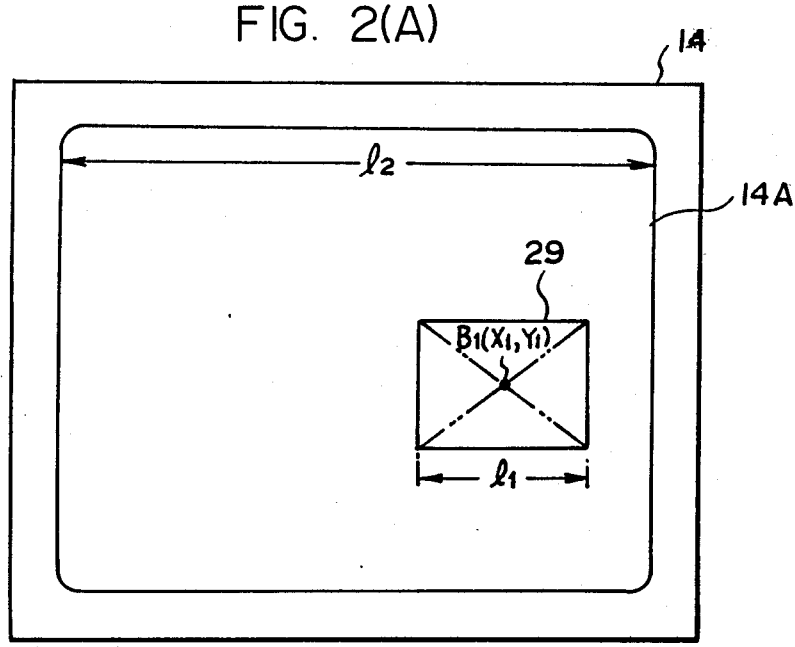
FIGS. 2, 3 and 4 are respectively explanatory views to explain a combined image displayed on a monitor television; and, FIG. 5 is an explanatory view to illustrate an example of display on a multi-screen.
Figure 2B:
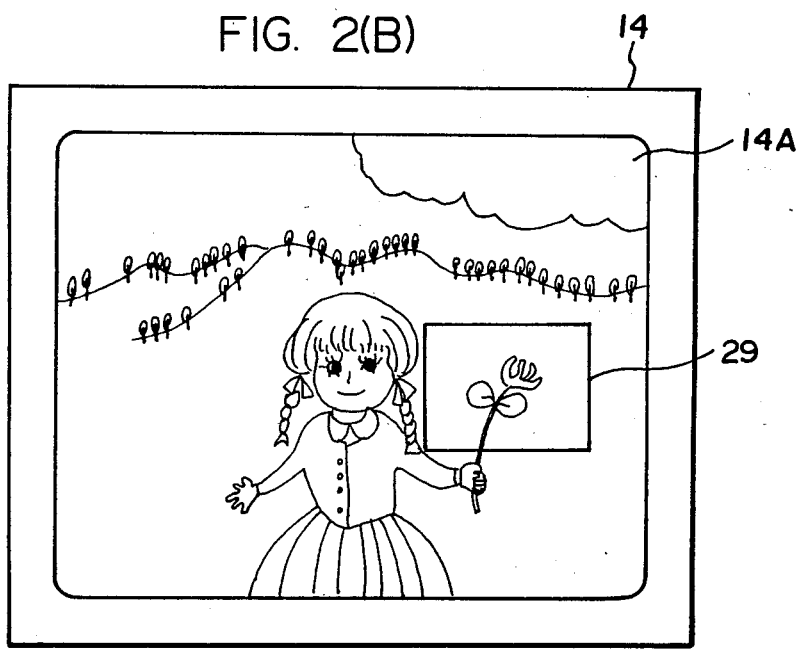
Figure 2C:
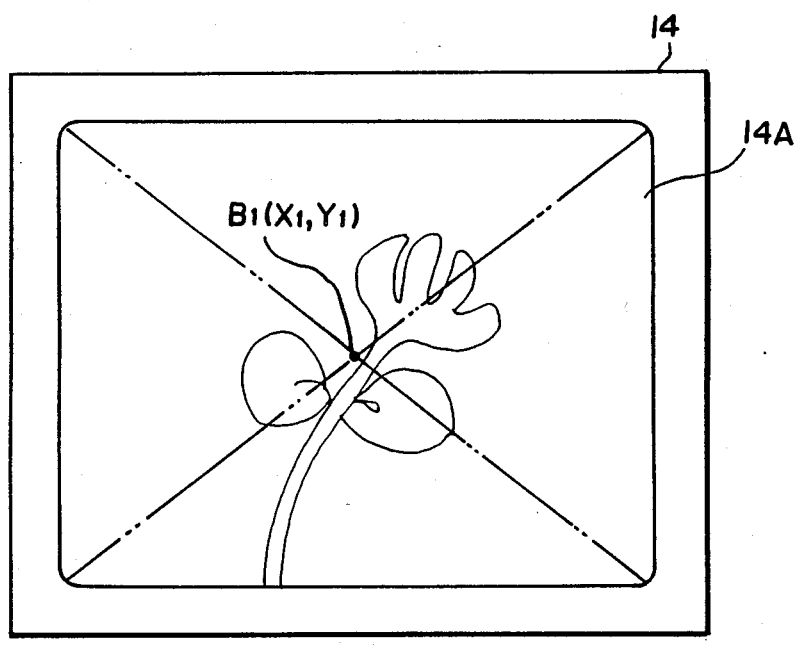

At first, by illuminating the photographic print 2 placed on the X-Y table 4 using the lamps 6, 6, the photographic print is photographed by the color TV camera 8. With this photographing or image pickup, the video signal 26 output from the color TV camera 8 is supplied through the signal processing circuit 12 to the monitor television monitor 14. As a result of this, a still image having a width of $l_2$ is displayed on the tube surface 14A of the television monitor 14. Next, for example, an instruction is given to the control unit 18 by means of the keyboard 32 to the effect that, as shown in FIG. 2(A), a trimming frame 29 having a width of $l_1$ and movable on the tube surface 14A of the television monitor 14 is displayed. In response to this instruction, the control signal PATN is output from the control unit 18 to the pattern generation circuit 10 and the pattern generation circuit 10, in accordance with the control signal PATN, outputs to the signal process circuit 12, a pattern signal which corresponding to the trimming frame 29. In accordance with the video signal 26 from the color TV camera 8 and the pattern signal from the pattern generation circuit 10, the signal process circuit 12 creates the video signal 28 and outputs the same to the television monitor 14. As a result of this, a combined image in which the trimming frame 29 is superimposed on the photographic print 2 is displayed on the tube surface 14A of the television monitor 14, as shown in FIG. 2(B). Here, in accordance with the instruction input via the keyboard 32 to the control unit 18 to the effect that the whole still image is displayed on the tube surface 14A of the television monitor 14, the control unit 18 outputs, to the optical system 8A of the color TV camera 8, a zoom signal for adjusting the image pickup magnification to a predetermined magnification ($Z_1$). After the image pickup magnification ($Z_1$) is determined, the joystick 31 is operated to move the trimming frame 29 to the area of the still image to be trimmed. The control unit 18, after the area of the still image to be trimmed is determined, takes in the coordinate values ($X_1$, $Y_1$) of the X-Y table 4 corresponding to the center of the trimming frame 29 and the image pickup magnification ($Z_1$), and stores the same. Next, the control unit 18 outputs to the X-Y table 4 drive signals X, Y for coinciding the optical axis (coordinate values (Xo, Yo) of the color TV camera 8 with the center of the partial image shown by the trimming frame 29, $X_1$, $Y_1 \rightarrow Xo$, Yo). With this, the control unit 18 also outputs to the color TV camera 8 a zoom signal for controlling the optical system 8A to an image pickup magnification $Z_2(Z_2 = Z_1 \times l_2/l_1)$ so that the partial image can be enlarged and displayed on the entire tube surface 14A of the television monitor 14. As a result of this, the partial image, as shown in FIG. 2(C), is displayed on the entire tube surface 14A of the television monitor 14. If the trimming obtained is not satisfactory, the image pickup magnification ($Z_2$) is changed, or the X-Y table 4 is further moved for further trimming. The video signal 26 that corresponds to the partial image is supplied to the video signal output terminal $T_1$. The video signal to be output through the video signal output terminal $T_1$ is recorded onto a recording medium, such as a magnetic disc, in an image recording apparatus which is provided separately from the present still image trimming apparatus.

Figure 3A:
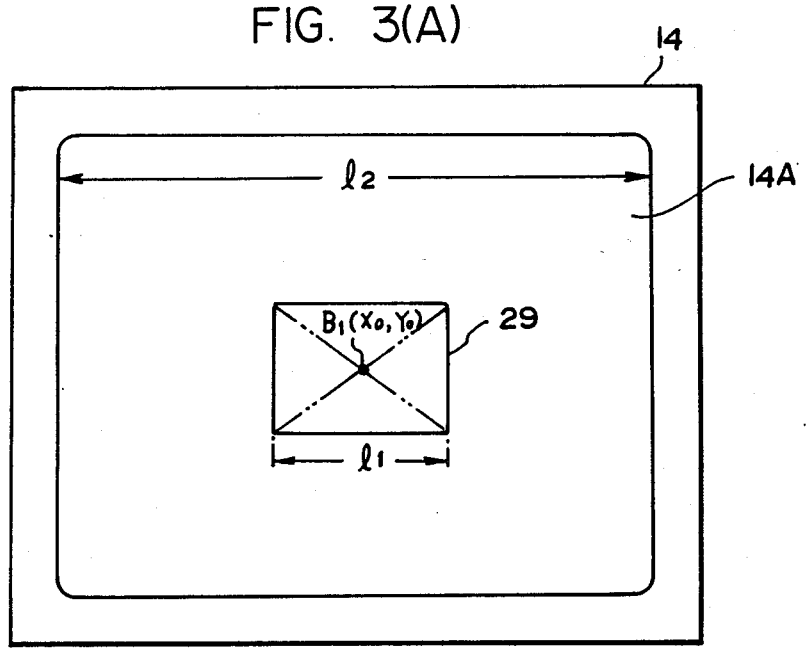
Figure 3B:
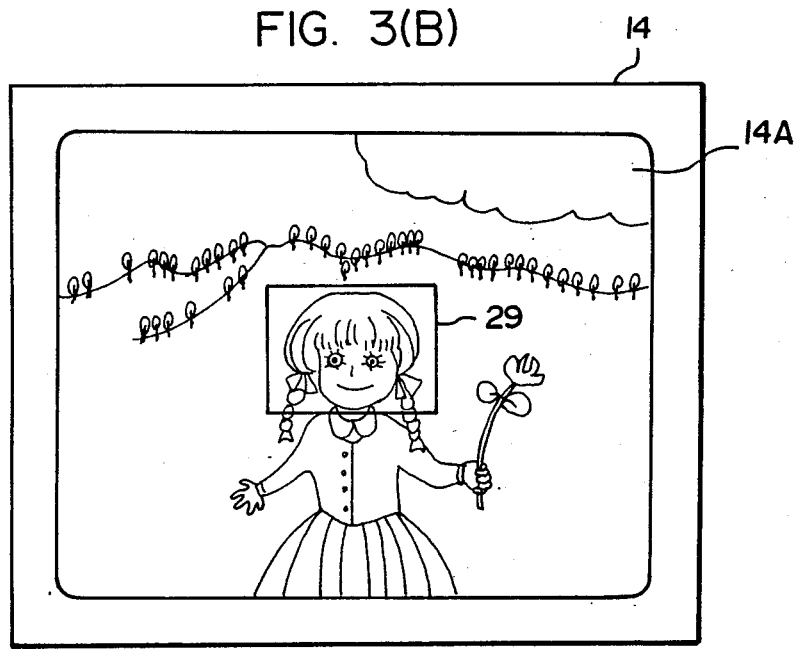
Figure 3C:
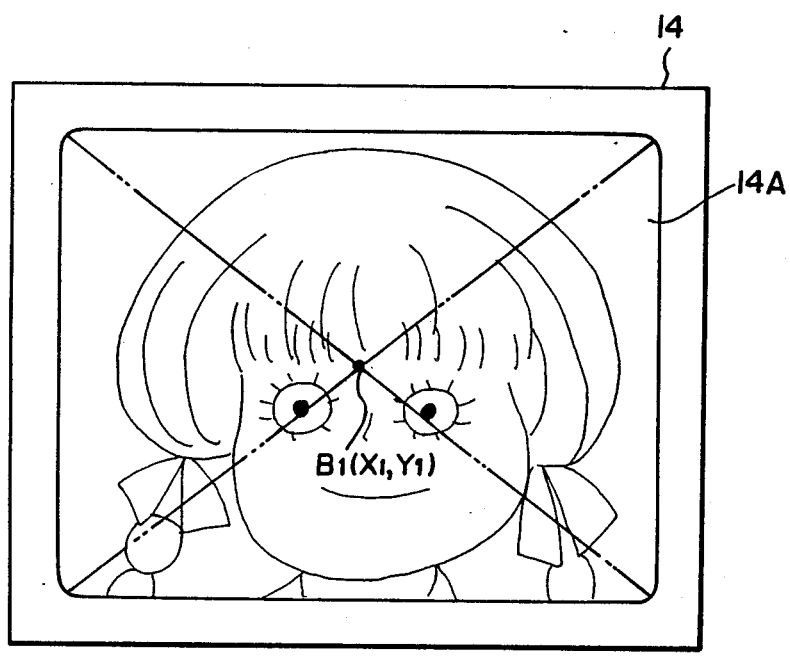

Also, when the still image is trimmed while the trimming frame 29 is fixedly displayed in the center of the tube surface 14A of the television monitor 14, as shown in FIG. 3(A), at first, the control unit 18 outputs to the optical system 8A of the color TV camera 8 a zoom signal for adjusting the optical system 8A to the image pickup magnification ($Z_1$) so that the entire still image can be displayed on the tube surface 14A of the television monitor 14 as shown in FIG. 3(B). Next, the control unit 18 outputs to the X-Y table 4 the drive signals X, Y in accordance with an instruction input therein via the keyboard 32 so that the area of the image to be trimmed is positioned in the trimming frame 29. After the image pickup magnification ($Z_1$) is determined, the control unit 18 takes in the coordinate values ($X_1$, $Y_1$) of the X-Y table 4 corresponding to the center of the trimming frame 29 and the image pickup magnification ($Z_1$) and stores the same. After the area of the image to be trimmed is determined, the control unit 18 outputs, to the color TV camera 8, the zoom signal for adjusting the optical system 8A to the image pickup magnification $Z_2$ ($Z_2 = Z_1 \times l_2/l_1$) so that the partial image in the area shown by the trimming frame 29 can be displayed on the entire tube surface 14A of the television monitor 14. Next, the control unit 18 outputs to the X-Y table 4 the drive signals X, Y for coinciding the optical axis (coordinate values (Xo, Yo)) of the color TV camera 8 with the center of the partial image shown by the trimming frame 29, ($X_1$, $Y_1 \rightarrow$ Xo, Yo). As a result of this, the partial image is displayed on the entire tube surface 14A of the television monitor 14 as shown in FIG. 3(C). If the trimming obtained is not satisfactory, the image pickup magnification ($Z_2$) is changed or the X-Y table is moved for further trimming.

As described hereinbefore, according to the illustrated embodiment of the still image trimming apparatus, in order to obtain a partial image from a still image, a still image in the photographic or similar print, placed on the X-Y table 4, is picked up by the color TV camera 8 and displayed on the television monitor 14. The trimming frame 29 corresponding to the partial image is also displayed on the television monitor in such a manner that it is superimposed on the still image, so that the image in the area shown by the trimming frame 29 can be picked up in a predetermined image pickup magnification. As a result of this, the partial image displayed on the television monitor 14 by the trimming frame 29 corresponds to an image displayed on the screen of a television, such that the partial image to be displayed on the television can be trimmed while monitoring the image displayed on the tube surface 14A of the television monitor 14.

In the above-mentioned embodiment, description has been given of the operation of the present still image trimming apparatus in creating a partial image from a still image. Now, description will be given of an operation in creating the respective divisional images of a still image to be displayed on a multi-screen with reference to FIG. 4.

Figure 4A:
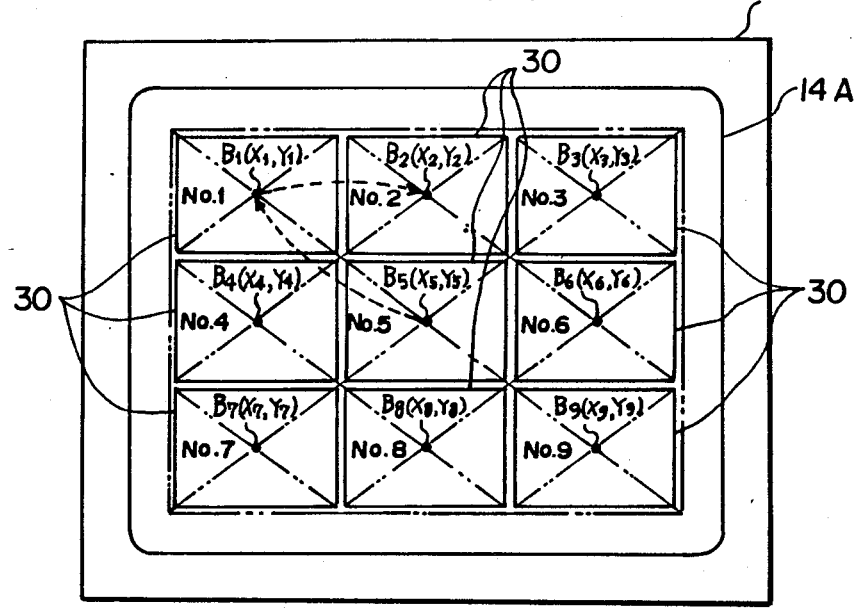
Figure 4B:
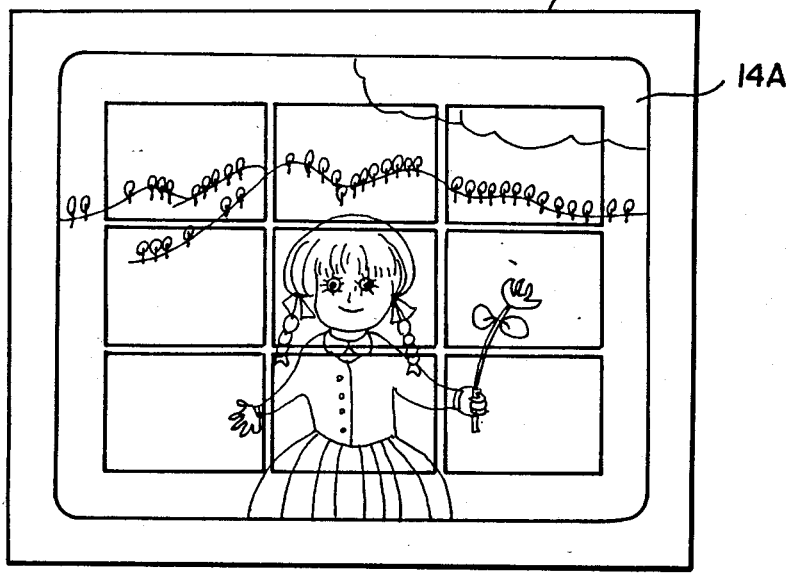

At first, the photographic print 2 placed on the X-Y table is illuminated by the lamps 6, 6 and is photographed by the color TV camera 8. With this photographing, a video signal 26 that is output from the color TV camera 8 is supplied through the signal processing circuit 12 to the television monitor 14, so that a still image is displayed on the tube surface 14A of the television monitor 14. Next, an instruction is given, by means of the keyboard 32, to the effect that the still image is to be divided into parts in a manner corresponding to the screen structure of the multi-screen. For example, when the multi-screen is divided into three equal parts in the horizontal and vertical directions thereof as shown in FIG. 4(A), a control signal PATN is output from the control unit 18 to the pattern generation circuit 10 so that 9 trimming frames 30, obtained by dividing the multi-screen into three equal parts in the horizontal and vertical directions thereof, can be displayed on the tube surface 14A of the television monitor 14. In accordance with the control signal PATN, the pattern generation circuit 10 outputs, to the signal processing circuit 12, a pattern signal which corresponds to the 9 trimming frames 30. The signal processing circuit 12 creates a video signal 28 in accordance with the video signal 26 from the color TV camera 8 and the pattern signal from the pattern generation circuit 10, and then outputs the same to the television monitor 14. As a result of this, on the tube surface 14A of the television monitor 14, as shown in FIG. 4(B), there is displayed a combined image in which the 9 trimming frames 30, are superimposed on the still image of the photographic print 2. Also, at the time of initialization, the optical axis (coordinate values Xo, Yo) of the optical system 8A of the color TV camera 8 is set as to coincide with the origin B5 ($X_5$, $Y_5$) of the No. 5 divisional image ($X_1$, $Y_1 =$ Xo, Yo). Here, in order that the whole still image can be displayed on the tube surface 14A of the television monitor 14, in accordance with an instruction input through the keyboard 32 to the control unit 18, the control unit 18 outputs, to the optical system 8A of the color TV camera 8, a zoom signal for adjusting the optical system 8A to a predetermined image pickup magnification ($Z_1$). Next, after the image pickup magnification ($Z_1$) is determined, in accordance with an instruction input through the keyboard 32 to the control unit 18, the control unit 18 outputs to the X-Y table 4 drive signals X, Y so that the multi-image illustrated by the trimming frames 30, provides a desired display image.

Figure 4C:
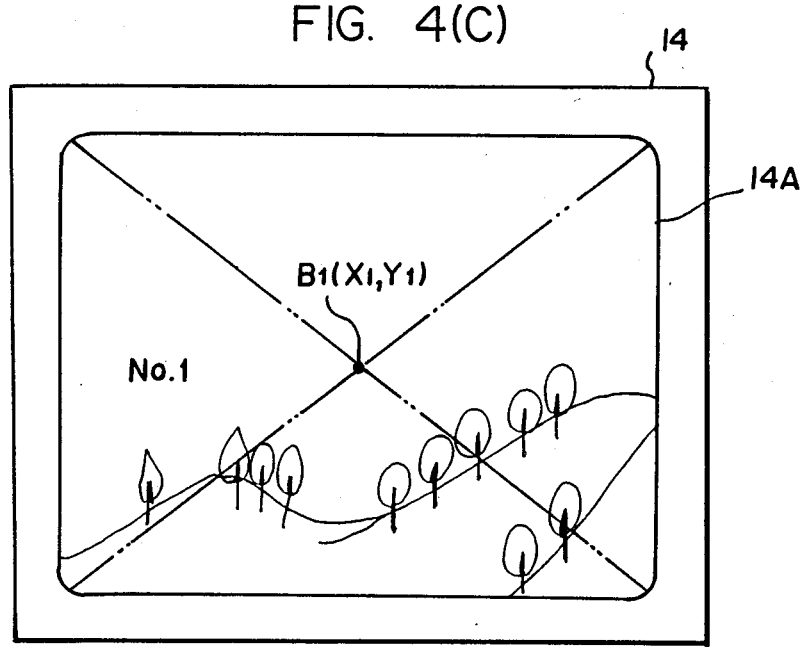

In this way, the entire structure of the multi-image is determined while monitoring the combined image displayed on the tube surface 14A of the television monitor 14. After completion of this processing, the control unit 18 outputs to the color TV camera 8 a zoom signal for adjusting the optical system 8A to a predetermined image pickup magnification $Z_2$ (where, $Z_2 = Z_1 \times 1/n$ (n is the number of the divisional images)), so that the still images of the photographic print 2 corresponding to 9 divisional screens (No. 1–No. 9) respectively shown by the trimming frames 30, can be picked up individually and sequentially. Further, the control unit 18 outputs to the X-Y table 4 drive signals X, Y for enabling the optical axis (coordinate values (Xo, Yo)) of the color TV camera 8 to coincide with the origin of one of the divisional images displayed on the divisional screens, for example, the origin B1 (X, $Y_1$) of the No. 1 divisional image. As a result of this, as shown in FIG. 4(C), the No. 1 divisional image is displayed on the entire tube surface 14A of the monitor television 14 and at the same time a video signal 26 corresponding to the No. 1 divisional image is supplied to the video signal output terminal $T_1$.

Next, the control unit 18 similarly outputs to the X-Y table 4 drive signals X, Y for enabling the optical axis (coordinate values (Xo, Yo)) of the color TV camera 8 to coincide with the respective origins B2 ($X_2$, $Y_2$)—B9 ($X_9$, $Y_9$) of the remaining still images of the photographic print 2 respectively belonging to the associated divisional screens. The respective video signals, obtained by sequentially picking up the respective divisional images, are recorded onto a recording medium such as a magnetic disc or provided in an image recording apparatus.

Figure 5:
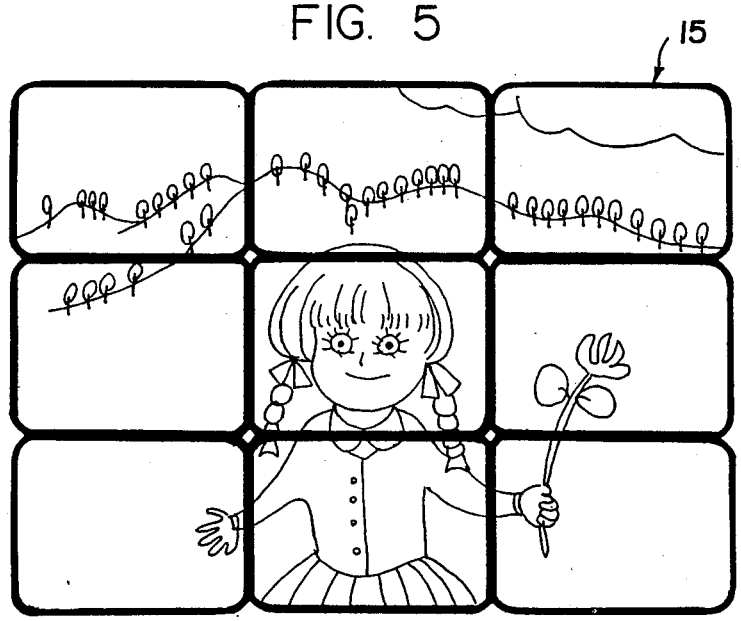

A multi-image 15 that is displayed on the multi-screen display device in accordance with the above-mentioned recorded images, as shown in FIG. 5, provides the same image with the still image that is divided by the trimming frames 30, displayed on the tube surface 14A of the television monitor 14 as shown in FIG. 4(B).

As described above, in the present embodiment of the still image trimming apparatus of the invention, in order to obtain the respective divisional images to be displayed on the multi-screen display device, the still image in the photographic print 2 placed on the X-Y table 4 is picked up by the color TV camera 8 and displayed on the television monitor 14 and, at the same time, the trimming frames 30 respectively corresponding to the respective divisional images are displayed on the television monitor 14 in such a manner that the trimming frames 30 are superimposed on the still image. Thereby, the images within the areas shown by the trimming frames 30 are sequentially picked up with a predetermined image pickup magnification. Thanks to this, the respective divisional images shown by the trimming frames 30 on the television monitor 14 are allowed to coincide with the respective divisional screens forming the multi-screen and, for this reason, the multi-image to be displayed on the multi-screen can be trimmed while monitoring the image displayed on the tube surface 14A of the television monitor 14.

As has been described hereinbefore, according to the still image trimming apparatus of the present invention, a combined image can be displayed which consists of a still image in a photographic or similar print and one or more trimming frames for setting the peripheral edges of the trimming areas of the still image. This occurs with the trimming frames being superimposed on the still image, and the still image within the image, being areas set by the trimming frames, can be picked up automatically with a predetermined image pickup magnification. Therefore, the still image can be trimmed while monitoring the combined image and at the same time a video signal corresponding to the image set by the trimming frames can be created automatically.

Also, according to the multi-image trimming apparatus of the invention, one or more trimming frames for setting the peripheral edges of the divisional images of a multi-image are superimposed on a still image in a photographic or similar print that is picked up by image pickup means to thereby create a combined image. The combined image is then displayed by image display means, whereby the still image can be trimmed while monitoring the multi-image that is formed by the respective divisional images corresponding to the screen structure of a multi-screen.

What is claimed is:

1. A still image trimming apparatus for picking up a still image of a photographic or similar type print and trimming the still image while displaying the same on a cathode-ray tube or similar display device, said apparatus comprising:
   a support table for supporting thereon said photographic or similar-type print;
   image pickup means including an optical system of a variable image pickup magnification for outputting a video signal obtained by photographing said photographic or similar type print placed on said support table;
   drive means for moving either of said support table or said image pickup means;
   pattern generation means for outputting a pattern signal indicating one or more trimming frames to define the trimming peripheral edges of said photographic or similar type print;
   signal processing means for combining said video signal from said image pickup means with said pattern signal from said pattern generation means and outputting a video signal corresponding to a combined signal consisting of said still image and said trimming frames superimposed on said still image;
   image display means for displaying said combined image in accordance with said video signal from said signal processing means; and,
   control means for automatically controlling said drive means to coincide the optical axis of said optical system of said image pickup means with the center of still image corresponding to an image area represented by said trimming frames, and also for performing a control to enlarge the image pickup magnification of said optical system so as to cause said image display means to display an enlarged image represented by said trimming frames.

2. A still image trimming apparatus as set forth in claim 1, wherein said control means controls said pattern generation means to move said trimming frames on said display screen of said image display means.

3. A still image trimming apparatus as set forth in claim 1, wherein said pattern generation means outputs a pattern signal for creating a plurality of trimming frames for a multi-screen.

4. A still image trimming apparatus which allows a user to select a portion, variable in size, of a displayed original to be trimmed and further enlarges and displays the entire trimmed image on a display means, the apparatus comprising:
   image pick-up means, comprising an enlarging means, for obtaining an image representative of an original;
   display means for displaying said image in response to receiving said image from said image pick-up means;
   input means for selecting a trimming frame of a desired size, said trimming frame being selected from a plurality of various sized trimming frames;
   processing means for combining said image and selected trimming frame in response to said input means, thereby forming a composite image;
   said display means displaying said composite image in response to said processing means;

frame positioning means for controlling said selected trimming frame to be positioned at a desired location on said display means, thereby allowing the user to select a desired portion of the image to be trimmed;

drive means for adjusting the positioning of said original with respect to said image pick-up means;

control means for automatically controlling said drive means to adjust the positioning of said original, in response to said frame positioning means, so that said selected desired portion of said image is now centered on said display means; and enlarging means for enlarging a portion of said image; said control means automatically controlling said enlarging means to enlarge said selected portion of said image to thereby allow only said enlarged image to be displayed on the entire display means, thus creating a desired trimmed still image.

5. An apparatus as claimed in claim 4, further comprising:

copying means for reproducing said desired trimmed still image onto a hard copy medium.

6. An apparatus as claimed in claim 4, wherein said image pick-up means is a T.V. camera.

7. An apparatus as claimed in claim 6, wherein said enlarging means is a zoom apparatus on a T.V. camera.

8. An apparatus as claimed in claim 4, wherein said input means is a keyboard.

9. An apparatus as claimed in claim 4, wherein said frame positioning means is a joystick.

10. A still image trimming apparatus for displaying each of a plurality of multiple trimming frames on a display, and then enlarging each of said plurality of multiple trimming frames to produce multiple separate trimmed images, the apparatus comprising:

image pick-up means, comprising an enlarging means, for obtaining an image representative of an original;

display means for displaying said image in response to receiving said image from said image pick-up means;

input means for selecting a number of multiple trimming frames to be utilized, said number of multiple trimming frames being selected from a plurality of various numbers of multiple trimming frames;

processing means for combining said image and selected number of multiple trimming frames in response to said input means, thereby forming a composite image;

said display means displaying said composite image in response to said processing means;

frame positioning means for controlling said selected multiple trimming frames to be positioned at a desired location on said display means, thereby allowing the user to select a desired portion of the image to be trimmed by the multiple trimming frames;

drive means for adjusting the positioning of said original with respect to said image pick-up means;

control means for automatically controlling said drive means to adjust the positioning of said original, in response to said frame positioning means, so that said selected desired portion of said image is now centered on said display means;

enlarging means for successively enlarging a portion of said image corresponding to each of said multiple trimming frames; and said control means automatically controlling said enlarging means to enlarge a portion of said image corresponding to each multiple trimming frame, to thereby allow only each of said enlarged images to be successively displayed on the entire display means, thus creating a desired trimmed still image for each of said multiple trimming frames.

11. An apparatus as claimed in claim 10, further comprising:

copying means for reproducing each of said multiple trimmed still image onto a hard copy medium.

12. An apparatus as claimed in claim 10, wherein said image pick-up means is a T.V. camera.

13. An apparatus as claimed in claim 12, wherein said enlarging means is a zoom apparatus on a T.V. camera.

14. An apparatus as claimed in claim 10, wherein said input means is a keyboard.

15. An apparatus as claimed in claim 10, wherein said frame positioning means is a joystick.

16. An apparatus, as claimed in claim 10, wherein said selected multiple trimming frames forms a grid when displayed as a composite image with said image of said original.

* * * * *